(12) United States Patent
Murata

(10) Patent No.: US 10,014,809 B2
(45) Date of Patent: Jul. 3, 2018

(54) MOTOR DRIVING APPARATUS

(71) Applicant: KABUSHIKI KAISHA TOKAI RIKA DENKI SEISAKUSHO, Aichi (JP)

(72) Inventor: Kenji Murata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 13 days.

(21) Appl. No.: 15/415,482

(22) Filed: Jan. 25, 2017

(65) Prior Publication Data

US 2017/0214350 A1 Jul. 27, 2017

(30) Foreign Application Priority Data

Jan. 27, 2016 (JP) .................. 2016-013032

(51) Int. Cl.
| | |
|---|---|
| *G05B 5/00* | (2006.01) |
| *H02H 7/08* | (2006.01) |
| *H02P 1/04* | (2006.01) |
| *H02P 3/00* | (2006.01) |
| *H02P 23/00* | (2016.01) |
| *H02P 29/024* | (2016.01) |
| *H02P 7/291* | (2016.01) |

(52) U.S. Cl.
CPC .......... *H02P 23/0077* (2013.01); *H02P 7/291* (2016.02); *H02P 29/027* (2013.01)

(58) Field of Classification Search
CPC ..... H02P 23/0077; H02P 7/027; H02P 29/027

USPC ......................................... 318/474
See application file for complete search history.

(56) References Cited

U.S. PATENT DOCUMENTS

2015/0061562 A1 3/2015 Fujii

FOREIGN PATENT DOCUMENTS

JP 2008-206319 A 9/2008

OTHER PUBLICATIONS

European Search Report from European Application No. 17153245.0 dated Jul. 4, 2017.

*Primary Examiner* — Erick Glass
(74) *Attorney, Agent, or Firm* — Roberts Mlotkowski Safran Cole & Calderon P.C.

(57) ABSTRACT

A motor driving apparatus includes a driving circuit that drives a motor based on a driving instruction signal at a first state of the first state and a second state which are binarized, a current feedback circuit including a latch circuit, and a controller that outputs the driving instruction signal and a current command signal. The latch circuit latches a third state of the third state and a fourth state which are binarized if a motor current value exceeds a current command value. When the driving instruction signal becomes the second state, the latch circuit releases the latching of the third state and outputs a signal of the fourth state. The controller outputs the driving instruction signal of the second state along with the current command signal so as to release the latching of the latch circuit when outputting the current command signal with the current command value changed.

4 Claims, 2 Drawing Sheets

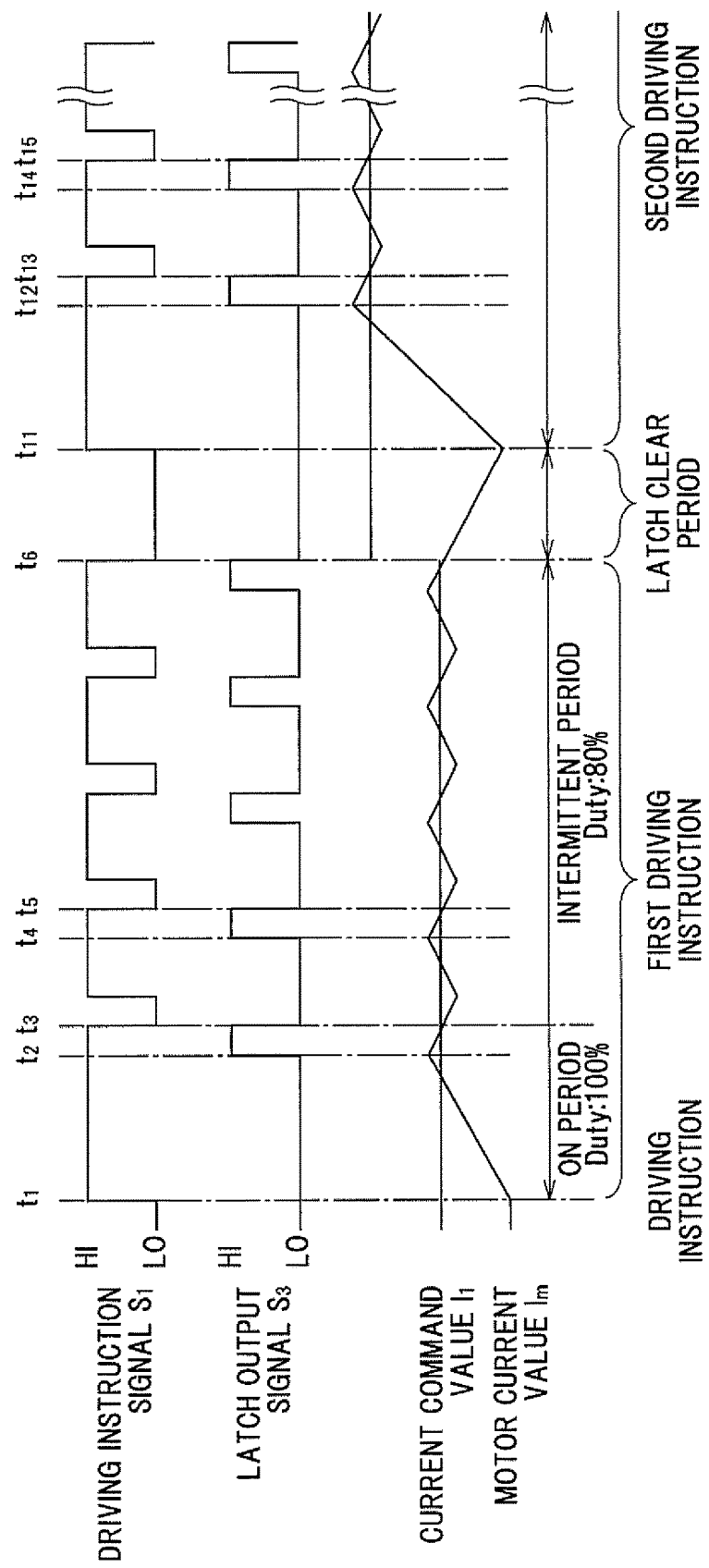

MOTOR DRIVING APPARATUS

The present application is based on Japanese patent application No. 2016-013032 filed on Jan. 27, 2016, the entire contents of which are incorporated herein by reference.

BACKGROUND OF THE INVENTION

Technical Field

The present invention relates to a motor driving apparatus.

Background Art

A power conversion apparatus that controls a current in a motor on the basis of a result of comparing a current command with a current feedback signal outputted from a current detector is known as an example of conventional technology (see Patent Document 1, for example).

CITATION LIST

Patent Literature

Patent Document 1: Japanese Unexamined Patent Application Publication No. 2008-206319A

SUMMARY OF INVENTION

Technical Problem

A current control apparatus is known in which, as an example of the above-described current control, the apparatus compares a current command value with a value of a current flowing in a motor and drives the motor intermittently with a constant current upon the current value exceeding the current command value. This current control apparatus includes a latch circuit. In this current control apparatus, a signal is switched from Lo to Hi upon the current value exceeding the current command value, and the latch circuit latches the signal of Hi state. There is a problem with this current control apparatus in that in the case where the current command value switches to another current command value without pause, the output of the latch circuit will not switch from Hi to Lo and will remain latched at Hi, so that current does not flow to the motor.

Accordingly, an object of the present invention is to provide a motor driving apparatus in which, even if a current command value has switched, a motor current based on the switched current command value can be supplied to a motor.

Solution to Problem

One aspect of the present invention provides a motor driving apparatus including a driving circuit that drives a motor on the basis of a driving instruction signal in a first state among first and second binary states, a current feedback circuit including a latch circuit, and a controller that outputs the driving instruction signal and a current command signal. The latch circuit latches a third state among third and fourth binary states in the case where a motor current value of a current flowing in the motor and a current command value based on the current command signal that is inputted are compared, and the motor current value exceeds the current command value. The latch circuit is released from a latch state in the third state and becomes the fourth state in the case where the driving instruction signal becomes the second state. The controller outputs the driving instruction signal in the second state along with the current command signal in the case of outputting the current command signal that changes the current command value.

Advantageous Effects of Invention

According to the present invention, even if the current command value has switched, the motor current based on the switched current command value can be supplied to the motor.

BRIEF DESCRIPTION OF DRAWINGS

FIG. 2 is a schematic diagram illustrating waveforms of signals and the like in an example of operations of the motor driving apparatus according to the embodiment.

DESCRIPTION OF EMBODIMENT

Overview of Embodiment

Figure 1:
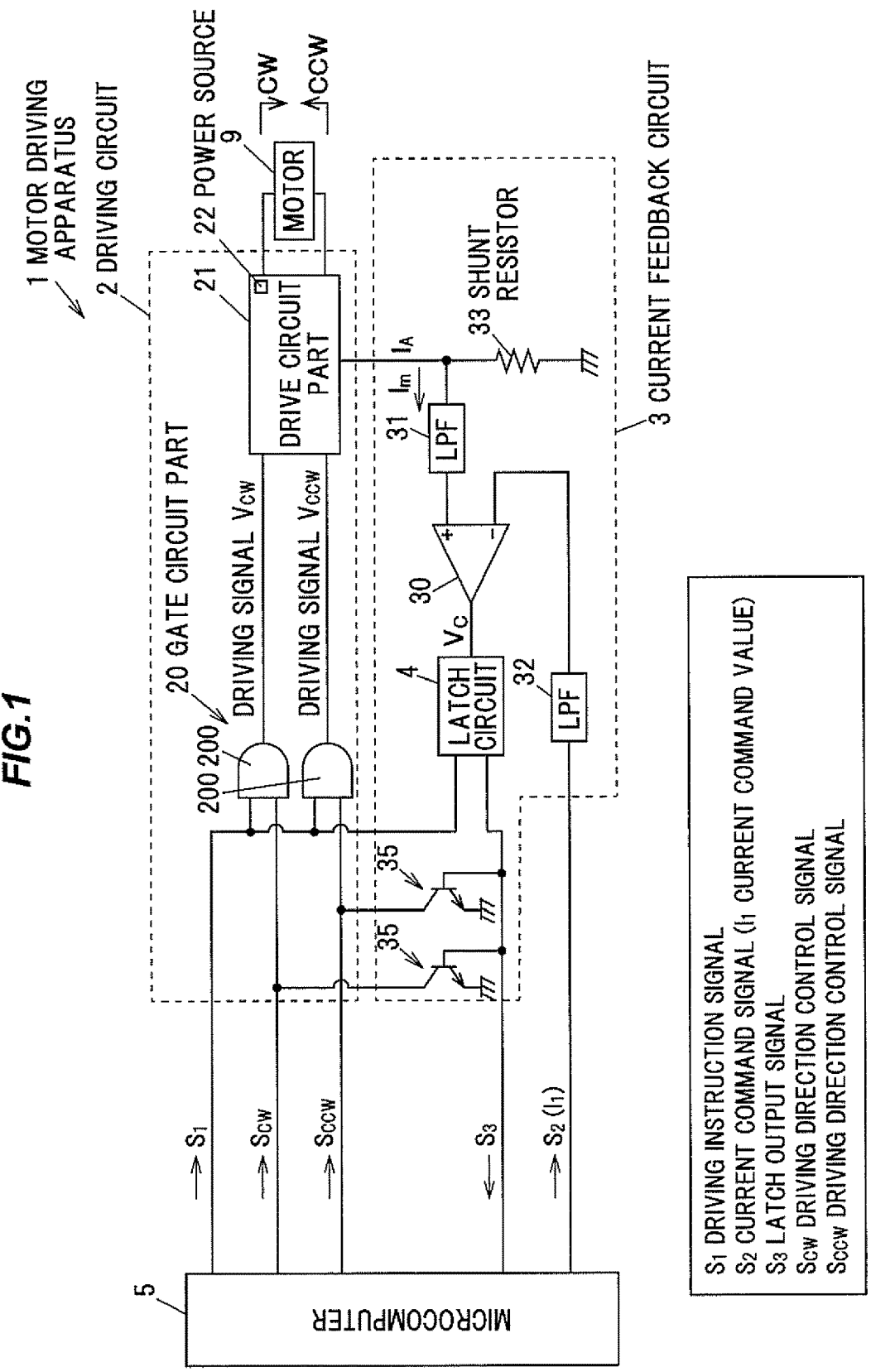
FIG. 1 is a block diagram illustrating an example of a motor driving apparatus according to an embodiment.

A motor driving apparatus according to an embodiment is generally configured including a driving circuit that drives a motor on the basis of a driving instruction signal in a first state among first and second binary states, a current feedback circuit including a latch circuit, and a controller that outputs the driving instruction signal and a current command signal. The latch circuit latches a third state among third and fourth binary states in the case where a motor current value of a current flowing in the motor and a current command value based on the current command signal that is inputted are compared, and the motor current value exceeds the current command value. The latch circuit is released from a latch state in the third state and becomes the fourth state in the case where the driving instruction signal becomes the second state. The controller outputs the driving instruction signal in the second state along with the current command signal and releases a latch state of the latch circuit in the case of outputting the current command signal that changes the current command value.

With this motor driving apparatus, even if a current command signal that changes the current command value of the current command signal inputted previously is continuously inputted, the driving instruction signal in the second state is outputted so as to release the latch state of the latch circuit. Thus compared to a case where this configuration is not employed, the third state does not continue to be latched, and thus even if the current command value switches, a motor current based on the switched current command value can be supplied to the motor.

Embodiment

Overview of Motor Driving Apparatus 1

FIG. 1 is a block diagram illustrating an example of the motor driving apparatus according to the embodiment. In FIG. 1, arrows indicate the flows of primary signals.

A motor driving apparatus 1 is configured to supply a motor current $I_A$ based on a current command signal $S_1$ to a motor 9.

As illustrated in FIG. 1, the motor driving apparatus 1 is generally configured including a driving circuit 2 that drives the motor 9 on the basis of a driving instruction signal $S_1$ in a first state among first and second binary states, a current feedback circuit 3 including a latch circuit 4, and a microcomputer 5 serving as a controller that outputs the driving instruction signal $S_1$ and a current command signal $S_2$. The latch circuit 4 latches (holds) a third state among third and fourth binary states in the case where a motor current value $I_m$ of a current flowing in the motor 9 and a current command value $I_1$ based on the current command signal $S_2$ that is inputted are compared, and the motor current value $I_m$ exceeds the current command value $I_1$. The latch circuit 4 is released from a latch state in the third state and becomes the fourth state in the case where the driving instruction signal $S_1$ becomes the second state. The microcomputer 5 serving as the controller outputs the driving instruction signal $S_1$ in the second state along with the current command signal $S_2$ and releases a latch state of the latch circuit 4 in the case of outputting the current command signal $S_2$ that changes the current command value $I_1$.

The first state in the present embodiment is Hi. The second state is Lo. The third state is Hi. Finally, the fourth state is Lo. Upon the input of the driving instruction signal $S_1$ indicating Hi, a driving circuit 100 starts driving the motor 9. The latch circuit 4 latches a Hi state in the case where the motor current value $I_m$ has exceeded the current command value $I_1$.

Configuration of Driving Circuit 2

As illustrated in FIG. 1, the driving circuit 2 is generally configured including a gate circuit part 20 and a drive circuit part 21, for example.

The gate circuit part 20 includes two AND circuits 200. The gate circuit part 20 outputs, for example, a driving signal $V_{CW}$ and a driving signal $V_{CCW}$ on the basis of the driving instruction signal $S_1$ and a latch output signal $S_3$ outputted from the latch circuit 4.

In the present embodiment, a rotating direction of the motor 9 is controlled, and thus the driving signal $V_{CW}$ or the driving signal $V_{CCW}$ is outputted from the corresponding AND circuit 200 as a logical product of the driving instruction signal $S_1$ and the latch output signal $S_3$, a driving direction control signal $S_{CW}$, or a driving direction control signal $S_{CCW}$. The drive circuit part 21 is driven by the driving signal $V_{CW}$ or the driving signal $V_{CCW}$, and a motor current $I_A$ generated by a power source 22 of the drive circuit part 21 is supplied to the motor 9. Note that the driving direction control signal $S_{CW}$ is a signal causing the motor 9 to rotate forward. The driving direction control signal $S_{CCW}$ is a signal causing the motor 9 to rotate in reverse.

Configuration of Current Feedback Circuit 3

The current feedback circuit 3 is generally configured including the latch circuit 4, a comparator 30, a low-pass filter (LPF) 31 and an LPF 32, and a shunt resistor 33.

The latch circuit 4 takes the driving instruction signal $S_1$ from the microcomputer 5 and a comparison output signal $V_C$ from the comparator 30 as inputs, and outputs the latch output signal $S_3$ on the basis of the driving instruction signal $S_1$ and the comparison output signal $V_C$ and latches the output state. The latch output signal $S_3$ is inputted into the microcomputer 5 and is inputted into the gate circuit part 20 via transistors (Tr) 35.

The comparator 30 outputs the comparison output signal $V_C$ as a result of comparing the motor current value $I_m$ with the current command value $I_1$. The comparison output signal $V_C$ is inputted into the latch circuit 4. The motor current value $I_m$ is inputted into a noninverting input terminal of the comparator 30 via the LPF 31. The current command value $I_1$ is inputted into an inverting input terminal of the comparator 30 via the LPF 32.

The shunt resistor 33 is connected to the drive circuit part 21. The shunt resistor 33 is also connected to the comparator 30 via the LPF 31. The current feedback circuit 3 includes the LPF 31 and the LPF 32 in order to reduce unstable operations caused by noise, voltage ripples, or the like.

Configuration of Microcomputer 5

The microcomputer 5 includes, for example, a central processing unit (CPU), a random access memory (RAM) and a read only memory (ROM) that are semiconductor memories, and the like. The microcomputer 5 also includes internal means for generating a clock signal, and operates on the basis of this clock signal. The microcomputer 5 generates the driving instruction signal $S_1$, the driving direction control signal $S_{CW}$, the driving direction control signal $S_{CCW}$, and the current command signal $S_2$.

The driving instruction signal $S_1$ is a pulse width modulation (PWM) signal, and is outputted to the gate circuit part 20 and the latch circuit 4. As described above, the driving direction control signal $S_{CW}$ and the driving direction control signal $S_{CCW}$ are signals that control the rotating direction of the motor 9, and are outputted to the gate circuit part 20.

The current command signal $S_2$ is a signal specifying the current command value $I_1$, which is a target value for the motor current $I_A$ flowing into the motor 9, and serves as a reference voltage by being inputted into the comparator 30 via the LPF 32. By adjusting the current command signal $S_2$, the microcomputer 5 controls the motor current value $I_m$ so as to adjust a rotation speed of the motor 9.

An example of operations of the motor driving apparatus 1 according to the present embodiment will be described below with reference to FIG. 2.

Operation

FIG. 2 is a schematic diagram illustrating waveforms of the signals and the like in the example of operations of the motor driving apparatus according to the embodiment.

In an ON period from time $t_1$, the microcomputer 5 outputs the driving instruction signal $S_1$ at Hi (duty: 100%) in response to a driving instruction for the motor 9 from the exterior (a first driving instruction), and outputs one of the driving direction control signals based on the rotating direction of the motor 9 to the driving circuit 2. In response to the driving instruction signal $S_1$ and the driving direction control signal, the gate circuit part 20 outputs a driving signal based on the driving direction to the drive circuit part 21, and the motor current $I_A$ flows to the motor 9. The motor current value $I_m$ of the motor current $I_A$ is inputted into the comparator 30 via the LPF 31. As illustrated in FIG. 2, this ON period is a period lasting until the driving instruction signal $S_1$ switches from Hi to Lo.

At time $t_2$, the comparator 30 outputs, to the latch circuit 4, the comparison output signal $V_C$ indicating that the motor current value $I_m$ has exceeded the current command value $I_1$. In response to the driving instruction signal $S_1$ being Hi and the comparison output signal $V_C$ being inputted, the latch circuit 4 switches the latch output signal $S_3$ from Lo to Hi.

After outputting the driving instruction signal $S_1$, upon detecting an edge where the latch output signal $S_3$ switches from Lo to Hi for the first time at time $t_2$, the microcomputer 5 changes the duty of the driving instruction signal $S_1$ from 100% to 80%, and an intermittent period starts. This intermittent period is a period, from time $t_3$ to time $t_6$, lasting until the current command value $I_1$ specified by the first driving instruction switches to a new current command value $I_1$ specified by a second driving instruction.

At this time (time $t_3$), the driving instruction signal $S_1$ has switched from Hi to Lo, and thus the latch state of the latch circuit 4 is cleared to switch the latch output signal $S_3$ from Hi to Lo.

Note that the microcomputer 5 ignores the latch output signal $S_3$ switching from Lo to Hi in the intermittent period, such as at time $t_4$. In other words, the microcomputer 5 keeps the duty of the driving instruction signal $S_1$ at 80% in the intermittent period.

In the case where, in the intermittent period, the latch output signal $S_3$ has switched from Hi to Lo in a period where the driving instruction signal $S_1$ is Hi, the latch output signal $S_3$ switches from Hi to Lo in synchronization with the driving instruction signal $S_1$ switching from Hi to Lo, thus, the latch state is cleared (time $t_5$). In this intermittent period, a motor current $I_A$ that the motor current value $I_m$ is above and below the current command value $I_1$ flows to the motor 9.

In the case where the current command value $I_1$ has been switched to a different current command value $I_1$ at time $t_6$, and the microcomputer 5 holds the driving instruction signal $S_1$ at Hi, the latch output signal $S_3$ will remain at Hi without the latch state being cleared because the driving instruction signal $S_1$ has not switched from Hi to Lo.

To clear the latch state when the current command value $I_1$ switches, in a latch clear period from time $t_6$ to time $t_{11}$, the microcomputer 5 according to the present embodiment switches the driving instruction signal $S_1$ from Hi to Lo so as to cause the latch state of the latch circuit 4 to be cleared. This latch clear period is an amount of time that is an integer multiple (no less than 2 times, for example) of the clock signal period, and as one example, is 100 ms. However, the latch clear period is not limited thereto. This latch clear period is changed in accordance with the specifications of the microcomputer 5.

The same control as that carried out from time $t_1$ to $t_5$ described above is carried out from time $t_{11}$ to time $t_{15}$, when the second driving instruction is in effect.

Effect of Embodiment

With the motor driving apparatus 1 according to the present embodiment, even if the current command value $I_1$ has switched, the motor current $I_A$ based on the switched current command signal $S_1$ can be supplied to the motor 9. Specifically, even if the current command value $I_1$ specified by the current command signal $S_2$ inputted previously is switched to a new current command value $I_1$ without pause, the motor driving apparatus 1 outputs the driving instruction signal $S_1$ with Lo level and releases the latch state of the latch circuit 4. Thus compared to a case where this configuration is not employed, with the motor driving apparatus 1, the latch circuit 4 does not continue to latch the Hi level, and thus even if the current command value $I_1$ has switched, the motor current $I_A$ based on the switched current command value $I_1$ can be supplied to the motor 9.

Parts of the motor driving apparatus 1 according to the embodiment and modification described above may, depending on the application, be realized by a program executed by a computer, an application specific integrated circuit (ASIC), a field programmable gate array (FPGA), or the like.

Although an embodiment of the present invention has been described above, this embodiment is merely an example and the invention according to claims is not to be limited thereto. This novel embodiment may be implemented in various other forms, and various omissions, substitutions, changes, and the like can be made without departing from the spirit and scope of the present invention. In addition, all the combinations of the features described in this embodiment are not necessarily needed to solve the problem of the invention. Furthermore, this embodiment is included within the spirit and scope of the invention and also within the invention described in the claims and the scope of equivalents thereof.

What is claimed is:

1. A motor driving apparatus, comprising:
a driving circuit that drives a motor based on a driving instruction signal at a high for a first state and at a low for a second state, the first state and the second state being binarized;
a current feedback circuit comprising a latch circuit; and
a controller that outputs the driving instruction signal and a current command signal,
wherein the latch circuit latches a third state which is at the high driving instruction signal for the third state and a fourth state which is at the low driving instruction signal, the third state and the fourth state being binarized if a motor current value exceeds a current command value when the motor current value flowing through the motor is compared with the current command value based on the current command signal that is inputted,
wherein when the driving instruction signal becomes the second state, the latch circuit releases the latching of the third state and outputs a signal of the fourth state, and
wherein the controller outputs the driving instruction signal of the second state along with the current command signal so as to release the latching of the latch circuit when outputting the current command signal with the current command value changed.

2. The apparatus according to claim 1, wherein when outputting the current command signal with the current command value changed, the controller switches the driving instruction signal from the second state to the first state and outputs that driving instruction signal after outputting the driving instruction signal of the second state for a predetermined period.

3. The apparatus according to claim 2, wherein the controller comprises a means for generating a clock signal, and
wherein the predetermined period is an integer multiple of a period of the clock signal.

4. The apparatus according to claim 1, wherein the first and third states comprise a high signal level, and the second and fourth states comprise a low signal level.

* * * * *